United States Patent [19]

Pugsley

[11] Patent Number: 4,598,282

[45] Date of Patent: Jul. 1, 1986

[54] VIDEO RETOUCHING SYSTEM

[75] Inventor: Peter C. Pugsley, Middlesex, England

[73] Assignee: Crosfield Electronics Limited, London, England

[21] Appl. No.: 478,944

[22] Filed: Mar. 25, 1983

[30] Foreign Application Priority Data

Mar. 30, 1982 [GB] United Kingdom ............... 8209323

[51] Int. Cl.$^4$ .............................................. G09G 1/28
[52] U.S. Cl. .................................... 340/703; 340/701; 340/799; 358/76; 358/80
[58] Field of Search ............... 340/701, 703, 789, 799, 340/798; 358/76, 78, 80; 178/4.1 R; 101/DIG. 1

[56] References Cited

U.S. PATENT DOCUMENTS

| | | | |
|---|---|---|---|
| 3,972,066 | 7/1976 | Seki et al. | 358/76 |
| 4,232,311 | 11/1980 | Agneta | 340/703 |
| 4,346,402 | 8/1982 | Pugsley | 358/80 |
| 4,418,358 | 11/1983 | Poetsch et al. | 358/80 |
| 4,463,373 | 7/1984 | Mikami | 358/76 |
| 4,468,692 | 8/1984 | Yamada et al. | 358/76 |
| 4,472,736 | 9/1984 | Ushio et al. | 358/80 |

Primary Examiner—Gerald L. Brigance
Assistant Examiner—Jeffery A. Brier
Attorney, Agent, or Firm—Sughrue, Mion, Zinn, Macpeak, and Seas

[57] ABSTRACT

This concerns retouching a set of n input image signals (1), one for each of the image printing colors, by converting these signals into a set of signals in a format (R, G, B) suitable for displaying the image on a monitor (3) to be viewed by an operator controlling the retouching. The converter (21) simulates the effect of the characteristics of the printing inks. In the present invention, for a rapid monitor response during retouching, the operator first generates, outside the main signal path from the image source to the monitor, a record (A) of n one-dimensional modifying functions corresponding respectively to the n printing colors. These printing-color modifying functions are converted into monitor-format modifying functions for storing in respective one-dimensional stores (B) in the said main signal path, where they modify the monitor-format image signals and therewith the displayed image. The same converter (21) and stores (A) may be used both to effect the conversion of the modifying functions and to effect conversion in the main signal path (position A1) in a subsequent slower "viewing mode" operation in which all input image signals are modified by the printing-color modifying functions (A) and are then passed through the converter (21) for a more accurate display of the modified image.

11 Claims, 3 Drawing Figures

VIDEO RETOUCHING SYSTEM

This invention relates to the electronic retouching of a coloured image, which is to be reproduced with printing inks, by modifying colour-signal video data while observing the result of the modifications on a monitor display.

In the following description, the term "colour space" refers to an imaginary volume in which values of different colour components (for example magenta, cyan and yellow) are plotted along respective mutually perpendicular axes. The term "monitor format" in relation to signals indicates that the signals are suitable for providing a display on a monitor. The term "one-dimensional store" indicates a memory of the look-up table kind having a single addressing parameter; a two-dimensial store indicates a memory of the look-up table kind having two independent addressing parameters, and so on.

The signals presented to the monitor must be in a suitable format; as an example, if the monitor display is formed with a conventional cathode ray tube, the signals must represent red, green and blue components of the image. However, signals suitable for controlling the preparation of separations for the colour printing process must be in a different format. Generally, this is either a three-colour format, in which the signals represents cyan, magenta and yellow (cmy) or a four-colour format for systems employing a black printer (cmyk, where k represents the black signal).

Generally speaking, a video retouching system will employ a signal store (for example a disc) on which are stored colour-component values for the ink printing colours for each pixel of the image; a colour converter for converting the ink-printing data values to monitor-format data values; a refresh store receiving and storing monitor-format data values; and the monitor which is supplied with signals from the refresh store.

In order to perform a real-time or almost real-time manipulation of the image on the monitor, it is necessary to carry out simple processes in the three-colour monitor format. Thus, methods and apparatus have been proposed enabling the operator to modify the monitor-display signals between the refresh store and the monitor.

When the operator finds the display on the monitor satisfactory, the modifying characteristics introduced by the operator can be converted into a form suitable for modifying the printing-ink signals and the modified printing ink signals can be used in the preparation of the colour separations.

A difficulty in converting signals from a monitor-display format to a printing-ink display format is that it is not possible to find in "colour space" (that is to say an imaginary volume defined by the colour-component axes) an exact equivalent, in terms of printing ink values, for each set of monitor display signals. This difficulty is felt particularly when four-colour printing is used. Where there is a black printer, a set of four values for the printing colours uniquely defines a set of three values (RGB) for the monitor but a set of three monitor values cannot uniquely define a set of four values for the printing colours. In converting from three-colour format to four-colour format an additional parameter is required to define how much of the black colour is added and what corresponding reduction of the other three colours is to be made. It is possible to define a global rule for this conversion, but the application of such a rule removes the freedom of the operator to make local variations in the way in which black is added. For these reasons, when look-up tables are used for the manipulation of the three-colour monitor data to make modifications in the displayed image interactively, subsequent conversion of the modified look-up tables to the printing colour domain, to modify the printing ink data in accordance with the retouched image, have been far from satisfactory.

It is therefore an object of the present invention to provide a video retouching system which modifies display data rapidly and interactively and yet which is not unduly hampered by the difficulty of converting from one colour domain to another colour domain.

Whilst the following description will deal specifically with four-colour printing, it should be realised that the invention is applicable generally to video retouching systems relating to the use of three or more printing colours; the invention is in fact advantageous whenever the colour conversion algorithm is sufficiently complex that three one-dimensional operators in monitor display colours cannot be exactly equivalent to n one-dimensional operators in ink values, where n is the number of printing inks to be used.

According to the present invention, a method of retouching colour printing data in the form of a set of n input image signals, one for each of the printing colours, and including monitoring the effect of the retouching, by converting the set of n input image signals into a set of three signals in a format suitable for displaying the image on a monitor, the conversion including simulation of the effect of the characteristics of the printing inks, applying the monitor-format signals through a refresh store to the monitor and modifying the display signals under the control of an operator viewing a representation of the input image on the monitor, comprises the steps of:

(a) under the control of the operator, generating or updating a record of n 1-dimensional modifying functions corresponding respectively to the n printing colours;

(b) converting the n printing-colour modifying functions into the said three-signal monitor format;

(c) storing the three monitor-format modifying functions in respective 1-dimensional stores;

(d) using the three stored monitor-format modifying functions to modify the three monitor-format image signals;

(e) applying the resulting modified monitor-format signals to the monitor to obtain a display of a representation of the modified image; and (f) when the operator is satisfied with the displayed modified image, using the n 1-dimensional printing-colour modifying functions to modify the input image signals for the subsequent production of colour separations under the control of those signals.

Thus, the method according to the present invention reverses the conventional procedures in that a unique set of printing colour modifying functions is generated by the operator and these are converted into a corresponding set of display-colour modifying signals to provide the interactive modification of the monitor display.

In general, it is not possible to obtain with a colour converter an exact correspondence throughout colour space between the printing ink functions and the display functions. In the case of four-colour printing, mathematically there are not enough degrees of freedom to permit exact correspondence. However, it is possible to make the modification of the display signals equivalent to the modification of the printing-colour signals along a particular path in colour space.

It is advantageous to use the same colour converter both for the conversion of the image signals and the conversion of the printing-ink modifying functions. However for the conversion of the printing ink modifying functions it is desirable to generate monitor modifying signals which are as nearly as possible exact equivalents of the printing-colour modifying signals. As stated above exact equivalence is not possible but one can obtain equivalence along a path in colour space and a good compromise is to choose the neutral axis in colour space for this path. Therefore, according to another preferred feature of the invention, additional one-dimensional modifying functions are introduced in series with the inputs to the colour converter used for the conversion of the printing-ink modifying functions, these additional modifying functions having characteristics which are substantially the inverse of the characteristics of the colour converter along the neutral axis. As an example, in the case of four-colour printing, three one-dimensional look-up tables for the three colour component signals can be provided to create these inverse functions with a fourth look-up table to assist in defining the content of neutral at each step in the scale and these are arranged in series with four one-dimensional look-up tables the contents of which can be modified by the operator. If (as is normally the case) equal colour-component signals represent neutral tones and if the operator's look-up tables are loaded with an identity function, then equal signals at the inputs of the "inverse" look-up tables will result in equal signals at the output of the colour converter.

Looked at in another way, the provision of the "inverse" tables C prevents the ink-simulation and gamma-correction characteristics of the colour converter from being used twice, once in the generation of the signals in the refresh store (which address the monitor-format tables) and once in the generation of the modifying functions which are used to load the monitor-format tables.

The signals at the output of the colour converter are used, in this preferred embodiment, to load look-up tables electrically connected between the refresh store and the monitor. A convenient way of loading these tables is to employ a sequence generator to provide a step addressing input both for the "inverse" look-up tables and for the look-up tables for the monitor-format signals between the refresh store and the monitor; the four "inverse" tables have the same input value or "address" and in turn provide addressing signals for the four look-up tables which are under the control of the operator; the outputs of the latter tables pass through the colour converter and the resulting values are loaded into the monitor-format look-up tables between the refresh store and the monitor, at the addresses dictated by the stepped input signals from the sequence generator.

With such an arrangement, the retouching operation is very fast. For example, 256 voltage steps (addresses) may be applied to the "inverse" and display-modifying look-up tables, to load the latter and as only the 256 sets of signals pass through the colour converter, this is done very rapidly. Thus, the operator is able to see very quickly the effect of his adjustment.

Using the "inverse" tables in series with the colour converter, as described above, the accuracy of the monitoring in the retouching mode is greatest for the neutral tones and least for the strongest colours.

When the operator is satisfied with the display on the monitor, the functions stored in the modifying look-up tables under the operator's control must be used to alter the stored image signals. It is also convenient if a more accurate modified image, requiring more time to generate, can be provided for the operator to view and this can be done very easily by arranging that the look-up tables under control of the operator and the colour converter are switched between a first arrangement (viewing mode) in which they are connected between the image store and the refresh store, and a second arrangement (retouching mode) in which they are connected between the "inverse" look-up tables and the display-modifying monitor-format look-up tables. Then when in the retouching mode the operator has adjusted his look-up tables and is satisfied with the result, the operator's tables and colour converter are switched to their first arrangement, so that the functions which he has loaded into the printing-ink modifying look-up tables are automatically connected to receive the printing ink signals from the image store.

The image signals are then passed, at the resolution required for the monitor, through the printing-colour modifying look-up tables and the colour converter, thence to the refresh store and monitor. This however is a slower operation, since the number of pixels to be passed through the colour converter may be 1024×1024, or at least 512×512.

If the operator is still satisfied with the viewed image, the record of the n modifying functions is saved, for use in the subsequent generation of final separations.

A video retouching system in which the present invention may be incorporated is described in the co-pending application U.S. patent application Ser. No. 473,400 in the name of Lindsay MacDonald filed 8th March 1983.

In order that the invention may be better understood, a preferred embodiment will now be described with reference to the accompanying drawings, wherein.

Figure 1:
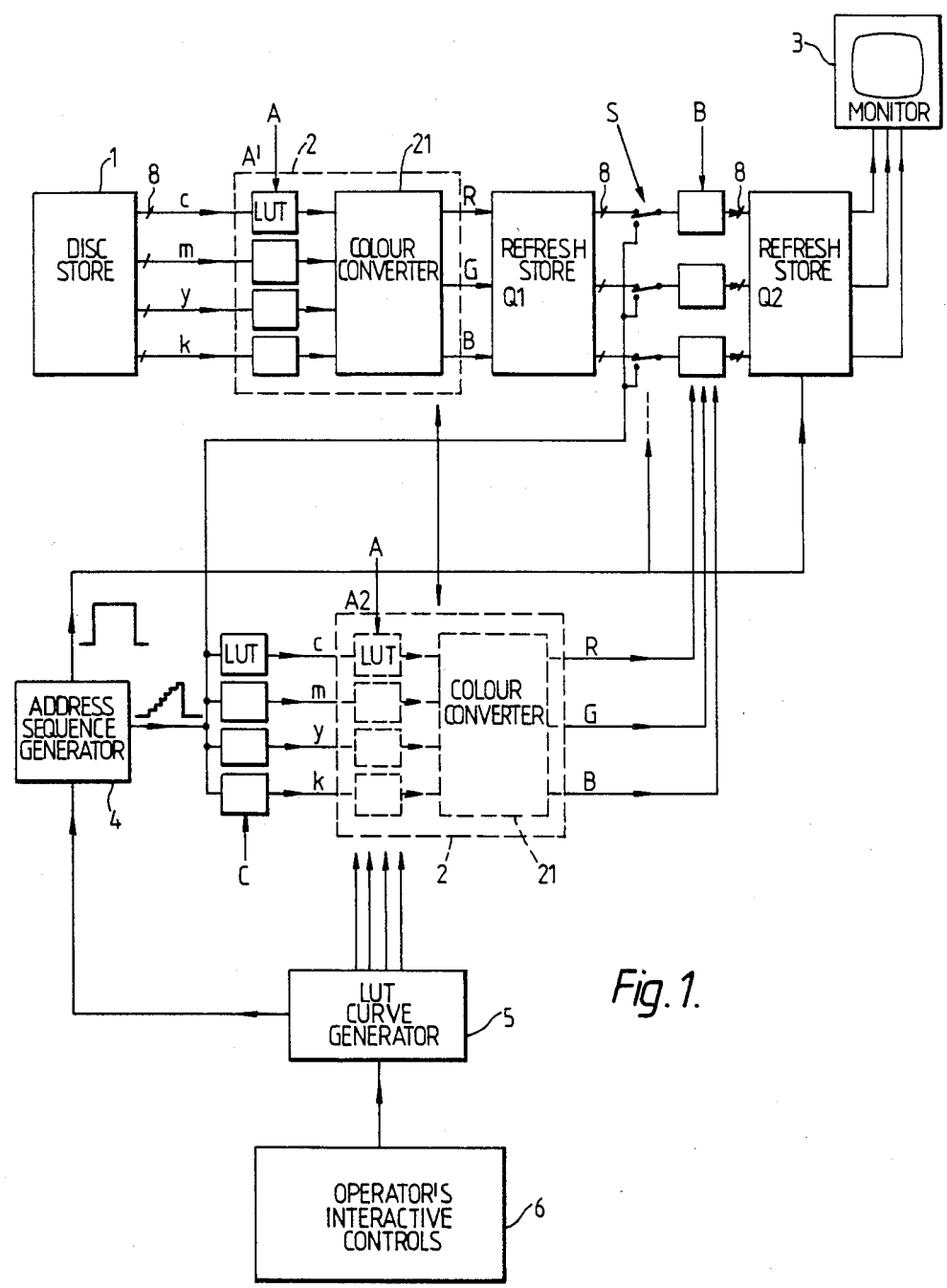
FIG. 1 is a block diagram of the data flow in a simple video retouching system incorporating the invention.

Referring now to FIG. 1, an original image is stored in a disc store 1. The colour video data in this store may be derived for example from high resolution data obtained by scanning a transparency wrapped around a rotating cylinder. The disc store 1 typically contains data representing the colour of each of 1024×1024 pixels for each image page. The colour of each pixel is represented by data for each of the four printing colours: cyan, magenta, yellow and black (C,M,Y & K). A television monitor screen 3 requires lower resolution data in a three-signal format, typically at a resolution of 512×512 pixels per image page. The apparatus selects a reduced-resolution version of the image of disc 1 for retouching and display on the monitor, for example by selecting one pixel out of every four stored on the disc.

The three signals for the monitor (R,G & B) must be derived in such a way as to simulate the colour distortions arising from the printing inks and the printing process. They are therefore applied to a conversion unit 2 in which they pass through look up tables A (which will be described later) to a converter 21, which incorporates cross-coupling terms to represent the colour properties of the inks to be used, and which compensates for the display gamma and converts the four-signal image data into the three-signal format suitable for supplying to the television monitor 3. The compensation is such that the image seen on the monitor screen resembles that which would be produced by printing and superimposing the four colour separations using the four signal data c m y k. In practice, the colour converter 21 would incorporate four one-dimensional look-up tables at its input and in practice it is convenient to combine these with tables A. There is then a single set of four one-dimensional tables into which are loaded combinations of the curves required for tables A and the curves required as part of the colour converter 21. For ease of explanation it will be assumed in the present description that the look-up tables A are separate from those in the colour converter 21.

Low resolution videodata for the three monitor colours are stored in a refresh store Q1, and subsequently in a refresh store Q2 separated from the store Q1 by three one-dimensional look-up tables 8. The image represented by data in the refresh store Q2 is displayed on the monitor 3.

By electrical or electronic switching the conversion unit 2 is used either in position A1 or in position A2, depending on the function currently being performed by the apparatus. With the conversion unit 2 in position A2, modifications to the original image, as represented by data from the disc 1 and now stored in Q1, are made by an operator through interactive controls 6, which may include a cursor arranged over a command panel, through a look-up table curve generator 5. The control panel 6 and LUT curve generator 5 operate in a similar manner to the corresponding control and curve-generating arrangement in a known digital scanner; the controls include highlight tone, mid-tone, shadow tone, set white, set black, etc. In this way, the look-up tables A are programmed in accordance with the operator's instructions through the interactive controls 6. These modifications are subsequently loaded into look-up tables B so that the refresh store Q2 receives combination of the data from store Q1 as modified by tables B. The operator is thus able to view the effect of his modifications on the monitor screen 3; he may introduce further modifications, and when he is finally satisfied with the result he causes the accumulated record of modifications in look-up tables A to be "saved" for use in the subsequent processing of the high resolution image.

It is important to ensure that the monitor displays only real colours, i.e. those which could be printed. Overrange colours have to be excluded during the retouching and monitoring stages, but overrange input image signals must not be lost because they are important during subsequent stages. Thus during the monitoring stages the four modifying functions extend only over the range of printable colours, for example between zero and 100% dot (or equivalent continuous tone density). When the operator is satisfied with the effect of these modifying functions for retouching, the functions are extrapolated so that they can then be applied to the original image signals including overrange signals.

The operation of the apparatus will now be described in greater detail. Starting with the apparatus switched to a "load image" mode a reduced resolution version of the image stored on the disc 1 is loaded through unit 2 into the refresh store Q1 and is displayed on the monitor screen 3 via the second refresh store Q2. Considering this operation in greater detail, first the look-up tables A are initialised by loading them with the identity function, such that the data stored is equal to the address. The contents of the look-up tables A are then represented by the dotted lines in FIG. 2a, in which data (ordinates) are equal to addresses (abscissae) for 0 to 255. Thus any signal applied to a look-up table A will then pass through unmodified. The combined unit 2 consisting of the look-up tables A and the converter 21 being now connected at position A1, the reduced resolution image signals pass from the disc 1 through the combined unit 2 at A1, in which they are converted to the monitor format, into the refresh store Q1 in which they are stored. Next the combined unit is switched to the position A2 and the look-up tables A are loaded with the functions illustrated in heavy lines in FIG. 2a. The look-up table A for each printing colour is loaded with data equal to the address over the range of printable colours, but equal to constant values for addresses above and below the printable range. Where the data and address range is 0 to 255, a typical scaling for screen work would be to assign 0% dot to level 25, and 100% dot to 225. Thus the maximum and minimum values of the data in FIG. 2a would be 225 and 25 respectively.

The next stage in the "load image" mode of operation is to start a sequence generator 4 operating. The signal to start the sequence generator 4 is supplied by the look-up table curve generator unit 5, once the look-up tables A have been programmed. The sequence generator supplies a step function which increases steadily in 256 steps as a function of time. The steps are used as addresses for four look-up tables C, the purpose of which will be explained below. The data output from the look-up table C is then used to address the corresponding look-up table A. The data output from the look-up table A is fed to the converter 21, the converter responding to each of the four outputs from the look-up tables A to derive a three-signal output in monitor format.

The switches S connecting the look-up tables B to their addressing inputs are operated so as to disconnect the look-up tables B from the refresh store Q1 and to connect them to be addressed by the step function from the sequence generator 4. The sequence generator 4 operates step by step to address the look-up tables B in synchronism with the addressing of tables C, so that at each step the three-signal output from the converter 21 is stored in corresponding ones of the look-up tables B at the address determined by the signal from the sequence generator 4. Data are thus stored in the look-up tables B at each step of the function from the sequence generator 4. At the end of the 256 stage sequence, the look-up tables B are full and the switches S are restored to the position shown in FIG. 1. The image data from refresh store Q1 are then used to address the look-up tables B, and the data output is transferred to the refresh store Q2, the outputs of which are applied to the monitor 3.

Figure 3:
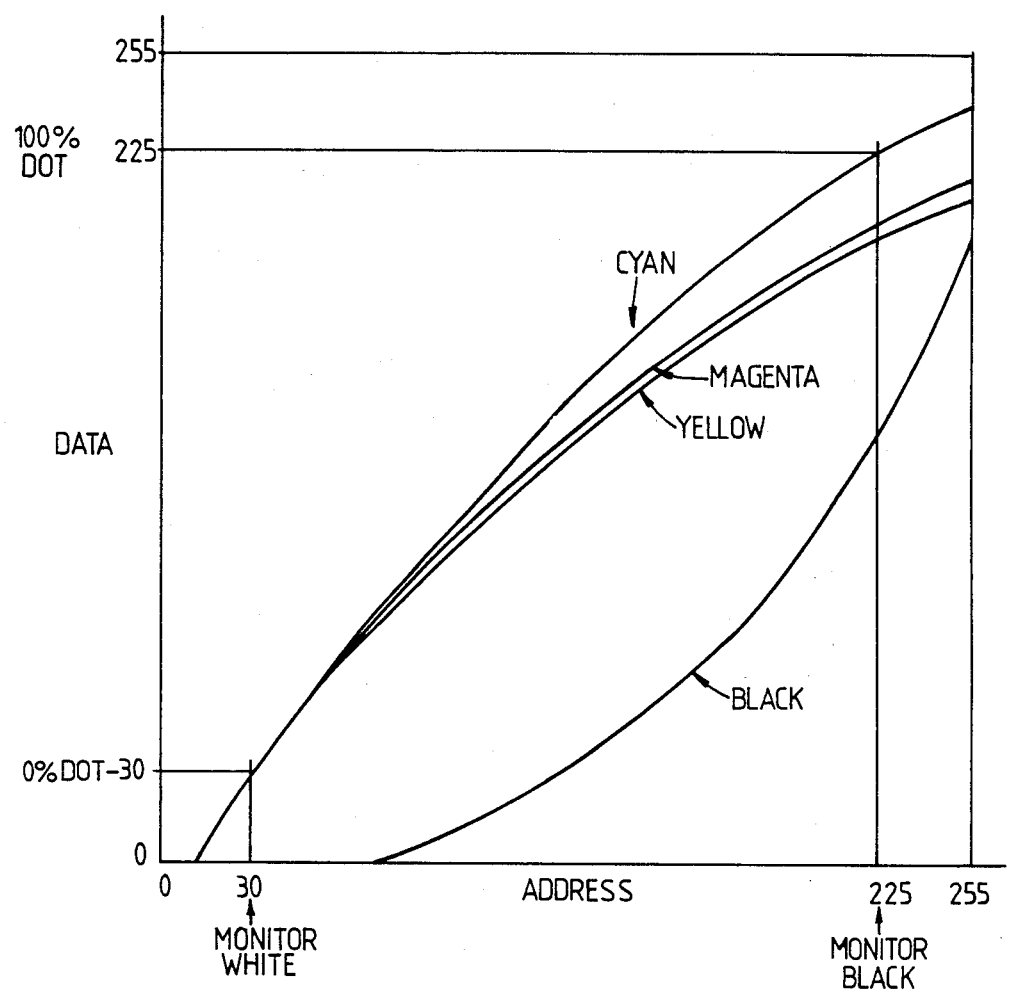
FIG. 3 shows typical examples of the data stored in the look-up tables C for ensuring equivalence for the neutral colours.

Considering now the function of look-up tables C, it will be appreciated that because converter unit 21 provides simulation of ink deficiencies and compensation for the display gamma, equal values of output signals R, G, and B are in general obtained with unequal input values c, m, and y. Look-up tables C provide inverse neutral characteristics, that is to say when the converter unit 2 is in its position A2 and tables A store identity functions, the same step voltage value applied to each of the look up tables C will result in equal signals R, G and B at the output of converter unit 2. An example of the contents of each look-up table C, suitable for screen work, is shown in FIG. 3. The scaling in FIG. 3 assumes an input address range from 0 to 255 and also assumes that the monitor is set to provide white for a value of 25 and black for a value of 225. The scaling for the output data (ordinates) is also from 0 to 255 with 0% dot at 25 and 100% dot at 225. The curves shown in FIG. 3 are continuous but the look-up tables in fact store discrete values for 256 addresses.

Because during the "load image" mode the look-up tables A store a simple identity function, and because the tables C provide functions which are the inverse of the functions provided by converter 21, the look-up tables B which are loaded with the outputs of converter 21 also store an identity function. Therefore the image displayed on the monitor 3 corresponds to the image signals from refresh store Q1, unaltered by tables B. Typically, with hardware presently available, the image-loading operation takes about 10 seconds.

Thus, tables C act to prevent the simulation of the ink-colour distortions and the compensations provided by the converter 21 from being added into the display signals twice; these compensations modify the input image signals with the converter unit 2 in position A1 and thus affect the signals stored in Q1 and, without tables C, these compensation factors would again affect the modifying signals with the converter unit 2 in position A.

The reason for providing a look-up table C for black is related to the need for accuracy in simulating the change in appearance of the c, m, y, k image, when printed with the modifications introduced by the four modifying functions, by the changes introduced in the monitor image generated from the R, G, B signals. This simulation can be exact only for a particular lineal sequence of neutrals. With four or more inks there is a degree of freedom in the composition of neutrals from the inks. The shape of the four curves (including black) in the look-up tables C defines the composition of the neutral at each step in the scale.

Irrespective of that consideration a further reason for providing look-up tables C, including one for black is that some scaling operation will generally be necessary in the look-up tables C to correct from a representation of monitor video volts to a representation of ink value (percentage dot or separation density).

The principal advantages of the present invention become apparent from the "retouch" mode of operation, which will now be described in detail. The retouching and monitoring sequence is carried out automatically each time an incremental adjustment is made by the operator, allowing the operator to see an approximate representation of the results of his adjustments on the monitor screen within approximately half a second. The response is rapid, but the accuracy of the display is limited in coloured areas, especially if a substantial change of picture appearance is made.

Figure 2:
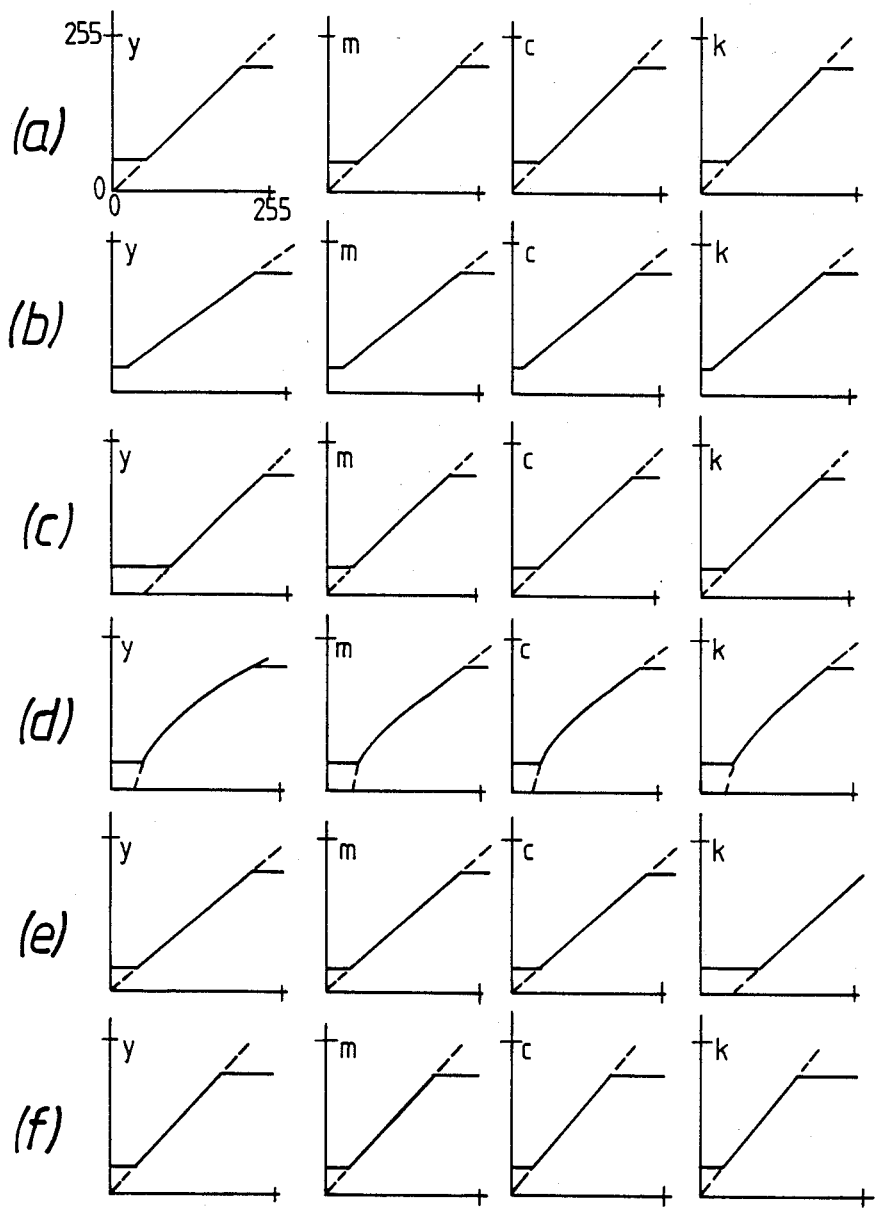
FIGS. 2a to 2f show typical examples of the four modifying functions stored in the records (A)

In the "retouch" mode, the look-up tables A are loaded with curves corresponding to the operator's retouching adjustment defined in terms of the four printing colours. Examples of the curves in look-up tables A are illustrated in FIGS. 2b to 2f, the curves in FIG. 2a corresponding to the initial state before retouching. The curves in FIG. 2b result from the modification of the white point, all colour channels having been moved. The curves in FIG. 2c show changes only in the yellow colour, as a result of the correction of yellow highlight cast, causing the yellow channel to be moved. Retouching involving increasing the highlight contrast affects all channels, and the result in the look-up tables A is shown in FIG. 2d. When the black separation is to be reduced, a typical result is shown in FIG. 2e. Modification of the black point, i.e. the point of maximum colour density, is illustrated in FIG. 2f in which all the channels have been moved. The retouching functions illustrated in FIGS. 2b to 2f may be used in combination, and the examples do not show the whole range of functions available. The broken lines in these figures indicate the curve extensions or extrapolations used in the "save" mode to be described below.

The curves for retouching stored in look-up tables A must include the limitation in their range to 0 to 100% dot (or continuous tone equivalent).

The next stages of operation in "retouch" mode are identical to stages described above for "load image" operation. The sequence generator 4 supplies a step function both to the look-up tables C and to the address input of the look-up tables B via switches S. Each step is processed through look-up tables C and A and through the converter 21, and the three results are loaded into the look-up tables B at the address determined by the step value. At the end of the sequence, with all the addresses of tables B loaded, the switches S are restored to the position shown in FIG. 1. The image is then transferred from the refresh store Q1 to the refresh store Q2 via the look-up tables B, and an indication that the action has been completed is supplied to an overall control processor.

The step signals supplied by the sequence generator 4 to the look-up tables B and C may be considered as R, G and B addressing signals. They provide equal addressing signals to the look-up tables C, which by virtue of their "inverse" characteristics, convert them into an approximation of c, m and y values for addressing the look-up tables A.

The video retouching system is used interactively in that the operator decides on the next retouching modifications while observing the results on the monitor screen of the previous modifications. The "retouch" may be repeated as many times as necessary, and finally the operator enters a "view" command in order to view an accurate simulation of the effects of the accumulated modifications. Retouching operations are fast since each retouching operation requires only generating new tables A by means of units 6 and 5, running the stepping sequence from circuit 4 to load table B, and transferring the image from Q1 to Q2 by way of tables B. The loading of the tables is fast, since only 256 points are involved. The image transfer, involving 512×512 points, takes longer but the hardware is simple and can run quickly.

In the "view" mode of operation changes in the image take longer to effect and this mode is considered to be too slow to be repeated for effective interactive use. In this mode the combined unit 2 is moved to position A1, the existing retouching data being retained in look-up tables A. Signals from the disc 1 are then used to address the look-up tables A, whose outputs are converted into the three-signal format and stored in the refresh store Q1, ready for display on the monitor screen 3. If the tables B are loaded with identity functions prior to the "view" mode, the contents of the reloaded store Q1 can be applied through tables B and refresh store Q2 to the monitor. If the tables B are not reloaded with identity functions, the look-up tables B and the second refresh store Q2 are bypassed, and signals from the refresh store Q1 are sent directly to the monitor screen.

Thus, in the "view" mode of operation all pixels (1024×1024), or at least 512×512 of them, must be read from the disc, processed through the colour converter, loaded into store Q1 and optionally transferred to store Q2. The relative, slowness of the view mode operation arises from the disc access time and the need to transfer all pixels to a store through the colour converter, which is much more complex than a simple look-up table.

At the end of the "view" operation, the combined unit is then restored to the position A2, and an indication is provided that the action has been completed.

If the operator, having "viewed" the effect of the modification, decides that a further retouching adjustment is necessary, then it is necessary to restore the apparatus to the state existing immediately before the "view" command. This includes replacing the modified image now stored in Q1 by the original image. The command for doing this is termed the "continue" command.

In "continue" mode, the current contents of look-up tables A are saved, and then the first stages of the "load image" function are performed: the look-up tables A are initialised with identity data; the combined unit is put into position A1; the image is transferred from the disc 1 through the combined unit into the refresh store Q1; and the combined unit is restored to position A2. The saved contents are then restored to the look-up tables A, and the sequence generator is started, exactly the same sequence then being used as was used in the "load image" and "retouch" modes for loading the look-up tables B and monitoring the image. An indication is then provided to the central controller that the action has been completed.

When the operator is satisfied with the accumulated modifications, stored in the look-up tables A, he then issues a "save" command, and the apparatus enters the "save" mode. This is the final stage of saving the look-up tables for subsequent application to the high resolution stored data used for generating the final separations. Until now the data has been limited to the printable range, but since some signals will be outside the printable range in the image stored on disc 1, it is necessary to extend the stored curves to cover the entire range (for example 0 to 255). The curves currently in the look-up tables A are therefore extrapolated or otherwise extended to extend smoothly from at least −10% to 110% dot (or equivalent continuous tone range). This extension is illustrated in the broken lines in FIGS. 2a to 2f. The resulting four modifying curves are stored and referenced to the appropriate image area for subsequent processing of the high resolution image. The apparatus is then arranged to display confirmation to the operator that the retouching of the appropriate area has been completed and that the retouching data has been stored successfully.

A "load mono image" mode is an alternative to the "load image" mode described above, and is useful when it is desired to create a coloured image from a monochrome image. The colour information in the original image is destroyed and is re-created. One colour component of the image is fetched from the disc file 1 and is loaded into all the colour planes of the refresh store Q1 so as to display a specified separation as a monochrome image. Retouching is then performed on this monochrome image to create the desired coloured image, the modifications being stored in the look-up tables A in the usual manner. The sequence is therefore the same as in the "load image" mode, with the exception that with the combined unit in position A1, all four inputs to the look-up tables A are derived from a specified colour of the disc image.

The second refresh store Q2 is not essential; instead, look-up tables B capable of handling the image data at the television monitor refresh rate could be employed, in which case the tables B could be connected directly to the monitor input.

In the above, it has been assumed that at the start of the operation, the colour converter is loaded with a suitable characteristics to imitate practical ink behaviour, and that the look-up tables C are loaded with a set of values which is the inverse of the colour converter characteristics, at least for the neutral tones. It will be appreciated that ink characteristics vary. A suitable method for achieving the initial loading is to set up the colour converter initially with typical ink characteristics, and to provide the required inverse characteristics for look-up tables C, and then to display suitable images and, with the equipment in the retouch mode, to adjust tables A until the displayed image on the monitor provides a good match for the printing characteristics. as judged by a visual comparison of the monitor image with a printed image for the same cmyk data. The "view" mode may be used to check that the representation is accurate. The new contents of the converter unit 2 and look-up tables A are now taken as the reference state which will be called up at the start of any retouching operation, and upon which any new retouching will be carried out in a cumulative manner. The new contents of the converter, with the modified input tables, are interrogated by software used solely during this phase of setting up, which automatically generates an inverse characteristic which is stored and loaded into look-up tables C.

Thus, among the concepts introduced by the apparatus described are: generating the modifying functions as one-dimensional c,m,y,k modifying functions, outside the main signal path from the image source to the monitor, and converting these functions to one-dimensional modifying functions for monitor-format signals; effecting this conversion using the existing colour converter from the main flow path in series with one-dimensional "inverse" characteristic tables which ensure that neutral tones are correctly affected by the changes made; and of using a sequence generator to step the look-up tables, for storing the one-dimensional functions, so that the functions are loaded simultaneously into the c,m,y,k tables and, in their converted form, into the R,G,B tables in the main flow path.

I claim:

1. A method of retouching, in an apparatus, colour printing data, for use in the reproduction of a coloured image, the data being in the form of a set of n input image signal, one for each n printing colours, and monitoring the effect of the retouching, by: converting the set of n input image signals into a set of three monitor-format display signals suitable for displaying the image on a monitor, the conversion including simulation of the effect of the characteristics of printing inks to be used to print a colour reproduction of the image, applying the monitor-format display signals through a refresh store to the monitor and modifying the monitor-format display signals to retouch the image and to provide a representation of the input image as retouched on the monitor, and comprising the steps of:
- (a) generating and holding in a computer store or updating a stored record of n 1-dimensional modifying functions corresponding respectively to the n printing colours;
- (b) converting, with a converter, the n printing-colour modifying functions into said three-signal monitor format;
- (c) storing the three monitor-format modifying functions in respective 1-dimensional stores;
- (d) using the three stored monitor-format modifying functions to modify the three monitor-format image signals;
- (e) applying at least once the resulting modified monitor-format signals to the monitor to obtain a display of a representation of the image when retouched; and
- (f) after the last application of step (e), using the n 1-dimenstional printing-colour modifying functions to modify the input image signals.

2. A method in accordance with claim 1, in which the set of n input image signals includes signals representing three colour-component signals and black, these four signals being converted into the three-colour signal monitor format, and in which a record of 1-dimensional modifying functions is generated or updated for each of the colour components and black.

3. A method in accordance with claim 2, in which the colour components and colour component signals are so related that unequal values of printing-ink image signals represent a neutral colour whereas equal values of monitor-format display signals represent a neutral colour in the display.

4. A method in accordance with claim 1, in which the step (a) the n 1-dimensional modifying functions are generated by causing a sequence generator to produce a step function which represents a sequence of addresses for each of n 1-dimensional stores, the method further comprising storing at the sequentially addressed locations of each store data representing modified step functions, each of the modifying step functions then constituting one of said n 1-dimensional modifying functions.

5. A method in accordance with claim 4, further comprising the step of modifying the n 1-dimensional modifying functions by further one-dimensional functions, one for each of the printing colour components, these additional one-dimensional modifying functions being such that, if equal input signals are applied through the additional modifying functions and through a colour converter used for the conversion in step (b), without modification by the 1-dimensional functions, equal output signals in monitor format are obtained from the converter.

6. A method in accordance with claim 5, in which the step-function address output of the sequence generator is used to address, in the retouching operation, both the one-dimensional stores preceding the colour converter and the three 1-dimensional stores which receive monitor-format signals from the colour converter.

7. A method in accordance with claim 1, further comprising a step of switching the converter used in step (b) in a retouching operation, and 1-dimensional stores used for storing the 1-dimensional modifying functions, into a connection between an image store and the refresh store, for converting the apparatus from a retouching mode to a viewing mode in which the modifications are reproduced with greater accuracy.

8. Apparatus for effecting a retouching operation on an image represented by electric signals displayed on a monitor screen, comprising:
- a source of colour-component image signals representing values of printing ink colour components for picture elements of the image;
- a colour converter for converting the printing ink colour component signals into three monitor format colour component signals, the converter simulating the effect of the printing inks used in a colour printing process;
- a refresh store receiving the monitor-format signals from the colour converter and applying them to the monitor;
- and further comprising, for each monitor format colour component a 1-dimensional look-up table connected between the refresh store and the monitor;
- for each printing ink colour component a 1-dimensional look-up table;
- control means for controlling the contents of the printing colour look-up tables; and
- means for converting the 1-dimensional functions set into the 1-dimensional printing colour look-up tables into three 1-dimensional functions for monitor format signals and loading the resulting functions into the three monitor format look-up tables;
- whereby an image, modified by the use of the control means, is displayed on the monitor and the corresponding modifying functions stored in the printing colour look-up tables can be used directly in the preparation of modified colour separations.

9. Apparatus in accordance with claim 8, in which a combination of the printing colour look-up tables and the colour converter can be switched between a first arrangement in which they are connected between the image source and the refresh store and a second arrangement in which they are disconnected from the image source and the output of the colour converter is connected to load the three monitor-format look-up tables for retouching operations.

10. Apparatus in accordance with claim 8, further comprising a further set of 1-dimensional look-up tables which are connected in series with the first printing colour look-up tables in the retouching operation, the further 1-dimensional look-up tables being loaded with characteristics such that in the absence of modification by the first printing colour look-up tables, equal-value colour component signals applied to the look-up tables will result in equal-value signals at the output of the colour converter.

11. Apparatus in accordance with claim 10 further comprising a sequence genrator for stepping the look-up tables conected ahead of the colour-converter for retouching operation and the monitor-format look-up tables through a sequence of addresses, to cause the output of the colour converter during retouching to be loaded into the monitor-format look-up tables.

* * * * *